US012569807B2

(12) United States Patent
Li et al.

(10) Patent No.: US 12,569,807 B2
(45) Date of Patent: Mar. 10, 2026

(54) METHOD FOR SIMULTANEOUSLY REMOVING HIGH-LOAD SULFUR DIOXIDE AND NITROGEN OXIDE IN WASTE GAS

(71) Applicants: Nanjing University, Nanjing (CN); NANJING UNIVERSITY YIXING ENVIRONMENTAL PROTECTION RESEARCH INSTITUTE, Yixing (CN)

(72) Inventors: Kan Li, Nanjing (CN); Xuxiang Zhang, Nanjing (CN); Hongqiang Ren, Nanjing (CN); Peishi Sun, Nanjing (CN); Zhichao Zhang, Nanjing (CN)

(73) Assignees: Nanjing University, Nanjing (CN); NANJING UNIVERSITY YIXING ENVIRONMENTAL PROTECTION RESEARCH INSTITUTE, Yixing (CN)

( * ) Notice: Subject to any disclaimer, the term of this patent is extended or adjusted under 35 U.S.C. 154(b) by 1260 days.

(21) Appl. No.: 17/387,659

(22) Filed: Jul. 28, 2021

(65) Prior Publication Data

US 2021/0354086 A1 Nov. 18, 2021

Related U.S. Application Data

(63) Continuation of application No. PCT/CN2020/073446, filed on Jan. 21, 2020.

(30) Foreign Application Priority Data

Feb. 1, 2019 (CN) ......................... 201910104477.7

(51) Int. Cl.
*B01D 53/56* (2006.01)
*B01D 53/50* (2006.01)
(Continued)

(52) U.S. Cl.
CPC ........... *B01D 53/85* (2013.01); *B01D 53/502* (2013.01); *B01D 53/504* (2013.01); *B01D 53/56* (2013.01);
(Continued)

(58) Field of Classification Search
CPC ........ B01D 2251/306; B01D 2251/402; B01D 2251/608; B01D 2251/80; B01D 2251/95;
(Continued)

(56) References Cited

U.S. PATENT DOCUMENTS 5,670,127 A * 9/1997 Sheu ........................ C01B 21/42 423/523

FOREIGN PATENT DOCUMENTS

CN 101708415 A 5/2010
CN 102179166 A 9/2011
(Continued)

OTHER PUBLICATIONS

Jianmeng Chen et al., “Performance evaluation of biofilters packed with carbon foam and lava for nitric oxide removal,” Journal of Hazardous Materials, Mar. 13, 2006, pp. 172-177.
(Continued)

*Primary Examiner* — Lydia Edwards

(57) ABSTRACT

A method for simultaneously removing high-load sulfur dioxide and nitrogen oxide in waste gas, relating to the technical field of industrial waste gas purification by biological methods. According to the method, the waste gas is led into a simultaneous desulfurization and denitrification packing tower and removed, microbial floras for simultaneously removing the sulfur dioxide and the nitrogen oxide are loaded on fillers of the packing tower, and the molar concentration ratio of the sulfur dioxide to the nitrogen oxide in the waste gas is (0.76~1.06):1.

6 Claims, 5 Drawing Sheets

(51) Int. Cl.

| | |
|---|---|
| ***B01D 53/82*** | (2006.01) |
| ***B01D 53/83*** | (2006.01) |
| ***B01D 53/85*** | (2006.01) |
| ***B01D 71/82*** | (2006.01) |

(52) U.S. Cl.

CPC ............ *B01D 53/82* (2013.01); *B01D 53/83* (2013.01); *B01D 2251/306* (2013.01); *B01D 2251/402* (2013.01); *B01D 2251/608* (2013.01); *B01D 2251/80* (2013.01); *B01D 2251/95* (2013.01); *B01D 2257/302* (2013.01); *B01D 2257/404* (2013.01); *B01D 2258/0283* (2013.01); *B01D 2259/124* (2013.01)

(58) Field of Classification Search

CPC ........ B01D 2257/302; B01D 2257/404; B01D 2258/0283; B01D 2259/124; B01D 53/502; B01D 53/504; B01D 53/56; B01D 53/82; B01D 53/83; B01D 53/85

USPC .......................................................... 435/266

See application file for complete search history.

(56) References Cited

FOREIGN PATENT DOCUMENTS

| | | | | |
|---|---|---|---|---|
| CN | 102228789 A | | 11/2011 |
| CN | 104043329 A | | 9/2014 |
| CN | 104226105 A | | 12/2014 |
| CN | 106474914 A | * | 3/2017 |
| CN | 109569270 A | | 4/2019 |
| CN | 109569271 A | | 4/2019 |
| KR | 101816518 B1 | | 1/2018 |

OTHER PUBLICATIONS

Kuoh H. Lee et al., “Simultaneous Combined Microbial Removal of Sulfur Dioxide and Nitric Oxide from a Gas Stream,” Applied Biochemistry and Biotechnology, 1991, pp. 623-634, vol. 28/29.

* cited by examiner

METHOD FOR SIMULTANEOUSLY REMOVING HIGH-LOAD SULFUR DIOXIDE AND NITROGEN OXIDE IN WASTE GAS

CROSS-REFERENCE TO RELATED APPLICATIONS

This application is a continuation of International Application No. PCT/CN2020/073446, filed on Jan. 21, 2020, which benefits and claims priority to Chinese Patent Application No. 201910104477.7, filed Feb. 1, 2019, which are hereby incorporated by reference in its entirety.

TECHNICAL FIELD

The invention relates to the technical field of industrial waste gas purification by biological method, in particular to a method for simultaneously removing high load sulfur dioxide and nitrogen oxides in waste gas.

BACKGROUND $SO_x$ and $NO_x$ are the main air pollutants, which are discharged from fossil fuel combustion. $NO_x$ contains many compounds, NO and $NO_2$ are the main pollutants, and they cause serious environmental problems due to their role in photochemical smog, acid rain and ozone layer destroyer. $SO_2$ is the most important part of SOx, accounting for more than 96%, so $SO_2$ can represent sulfur oxide generally. $SO_2$ directly leads to acid rain formation and ozone layer loss. As the emission and environmental pollution of $SO_x$ and $NO_x$ are increasingly concerned, the cleaning process of flue gas has attracted widespread attention. The report of Ministry of Ecology and Environment of China shows that the total output of $SO_2$ and $NO_x$ in power plants and industrial boilers is 16 million and 12 million tons respectively, accounting for about 90% and 70% of the total emissions, which are the main sources of sulfur dioxide and nitrogen oxides.

The main obstacle in the traditional flue gas purification process is to treat the solvent and solid adsorbent containing pollutants in an effective and environmental way. However, simply regarding $SO_2$ and $NO_x$ as pollutants is not conducive to the development of recycling economy globally, which requests the reuse of sulfur and nitrogen resources. In fact, flue gas containing SOx, $NO_x$, CO2 and other components can provide nutrients in liquid or aerosol as the substrate for microbial growth. The biotrickling-filters (BFs) have economic and practical advantages such as, long life, low operating cost and environmental friendliness, etc. BFs can also maintain high efficiency under room temperature without maintenance, which has made it one of the most common technologies in flue gas treatment. However, the obstacle of the application of BF is that the capacity of BF is generally lower than that of physical and chemical methods, so improvement of the treatment load is required, otherwise it is difficult for BFs to meet the increasing standards of emission. This can be attributed to the little knowledge of the principle and molecular mechanism of bio-treatment compared with the physical and chemical methods, which limits the further improvement of the efficiency.

According to the search, the method of simultaneous removal of sulfur dioxide and nitrogen oxides by microorganisms has been disclosed. However, the application of bio-treatment methods in removal of $SO_2$ or $NO_x$ in flue gas have long been hindered by several factors, among which low removal efficiency and small treatment capacity are the most important concern, which can be attributed to the adverse effects of acid flue gas on the growth of microorganisms. In early stage, low removal efficiency is the major obstacle, Nascimento et al. used the BFs to remove $NO_x$ in flue gas under aerobic condition, however, the removal rate was only 25% (Nascimento, Hudepohl et al. 2000). When simultaneous removal of $SO_2$ and $NO_x$ was firstly tried using the combination of two biofilter, the removal rate of NO was only 44.5%, and long term $SO_2$ removal was also inhibited by NO (Lee and Sublette. 1991). Some bioreactors claimed to achieve good performance in flue gas desulfuration or denitrification, however, most of these reactors were performed at relatively lower inlet workloads, e.g. NO removal efficiencies were above 93.8% in a biofilter during a long term (>8 months) running assay, however, the inlet concentration was only ~100 $mg/m^3$ and EBRT is as long as 3.5 min (Chen, Wu et al. 2006). The Chinese patent application No. 201110124316.8, published on Aug. 14, 2013, disclosed a method for improving the simultaneous desulfurization and denitrification efficiency of flue gas in BF by artificially compounding functional bacteria. By adding the artificial compound functional bacteria strain liquid and the original dominant bacteria strain liquid into the circulating liquid storage tank of the BF in proportion, the population structure of desulfurization and denitrification functional bacteria was optimized and the micro ecosystem was improved, so as to improve the efficiency of simultaneous desulfurization and denitrification of flue gas in BF. However, the method of the above application only has a removal rate of nitrogen oxides to 51% under the optimal ratio, and the concentration of $NO_x$ in flue gas treated by the application method is only 700-900 $mg/m^3$. Thus it can be concluded that the method of the application is difficult to deal with the removal of nitrogen oxides with high load.

These results are mainly due to the removal of $NO_x$ are through denitrification reaction in these studies, the denitrification microbes are less acid resist, which request the adjustment of pH of the BF circulation liquids; while the sulfidation reaction microorganisms are highly acid resistant. Thus the pH adjustment is another big obstacle, basically all the studies mentioned above required usage of chemicals and equipments to monitor and control pH of the BF. These buffer systems are counter measures applied to minimize the drawbacks of acids produced from $SO_2$ and $NO_x$. In order to solve the above problem, the related solutions are also disclosed formerly. For example, the Chinese patent application No. 200910218315.2, published on Aug. 19, 2015, disclosed a method for simultaneous removal of sulfur dioxide and nitrogen oxides from flue gas by a double tower series BFs, which uses one BF to remove $SO_2$ at the beginning, and another BF to remove $NO_x$ with the help of pH buffer as the circulate spray liquid. The former BF operates under pH acid conditions, mainly removing $SO_2$ and a small part of $NO_x$, thus the main by-product is sulfuric acid with a small amount of nitric acid; the latter biofilm packed column system operates under pH neutral condition to remove the remaining $NO_x$, and the by-product is mainly nitric acid. The sulfuric acid and nitric acid can be used as by-product. In the above application, double columns in series are used to remove $SO_2$ and $NO_x$, and the purification efficiency of $SO_2$ and $NO_x$ is significantly higher than that of the single BF, but the operation cost is increased to a certain extent by using double columns in series.

Besides these efforts, the Chinese patent application No. 201410324904. X, published on Jun. 15, 2016, disclosed a method of adding rare earth enhancer to improve the denitrification efficiency of a BF for simultaneous desulfurization and denitrification of flue gas. In the circulating liquid storage tank of the BF, a mixture of low concentration rare earth elements lanthanum (La) and cerium (Ce) is added as the biological activity enhancer, After mixing evenly, it is sprayed onto the packings in the tower with circulating liquid by circulating pump to stimulate and improve the adaptability of denitrification bacteria in the microbial flora dominated by autotrophic bacteria to low pH, and to promote the rapid growth and reproduction of denitrification bacteria under acidic conditions, so as to obtain the effect of improving the denitrification efficiency of BF for simultaneous desulfurization and denitrification of flue gas. The concentration of $SO_2$ and $NO_x$ in flue gas is 500-2000 mg/$m^3$ and 600-2000 mg/$m^3$ respectively, and the $NO_x$ removal rate of the system is 59%-66%, which is still low, and needs to be improved.

At the same time, the study of the chemical reaction mechanism, microbial community structure and corresponding molecular mechanism of simultaneous removal of sulfur dioxide and nitrogen oxides in flue gas is still not thorough, which brings great difficulties to further improve the method and maximize the benefits of biological treatment, resulting in the obstacle of further promoting the industrialization and engineering of the method.

SUMMARY

1. Problems to be Solved

In view of the defect that the treatment concentration is relatively low and the removal rate is not high in the BF for simultaneously removing sulfur dioxide and nitrogen oxides previously, the invention provides a method for simultaneously removing high load sulfur dioxide and nitrogen oxides in the waste gas efficiently. The method can improve the simultaneous removal efficiency of sulfur dioxide and nitrogen oxides under high load by setting the molar concentration ratio of sulfur dioxide and nitrogen oxides in the flue gas, and using directly acidification as the reaction mechanism.

2. Technical Solutions

In order to solve the above problems, the technical solutions adopted by the invention are as follows:

The invention provides a method for simultaneously removing high load sulfur dioxide and nitrogen oxides in waste gas. The waste gas is passed into a BF for removal. The packings of the BF are loaded with microbial flora, and the molar concentration ratio of sulfur dioxide and nitrogen oxides in the waste gas is (0.76~1.06):1.

As a further improvement of the invention, the microbial flora in the method for simultaneously removing high load sulfur dioxide and nitrogen oxide in the waste gas includes: *Arthrobacter, Nitrospira, Flavobacterium, Pseudomonas, Rhodococcus, Ralstonia, Hyphomicrobium, Pseudomonas, Rhodococcus, Bacillus, Acinetobacter, Candidatus Acinetobacter, Zoogloea, Hyphomicrobium, Dietzia, Burkholderia, Mycobacterium, Pseudomonas, Rhodococcus* and *Paenibacillus.*

As a further improvement of the invention, the microbial flora with nitrification or nitrite oxidation function include *Arthrobacter, Nitrospira, Flavobacterium, Pseudomonas, Rhodococcus* and *Ralstonia*, the microbial flora with denitrification function include *Pseudomonas, Rhodococcus, Bacillus, Acinetobacter, Candidatus Acinetobacter* and *Zoogloea*, while the microbial flora with sulfation function include *Burkholderia, Mycobacterium, Pseudomonas* and *Rhodococcus.*

As a further improvement of the invention, the microbial flora source for simultaneous removal of sulfur dioxide and nitrogen oxide includes biological sludge.

As a further improvement of the invention, the concentration of sulfur dioxide in the waste gas is 2700-3600 mg/$m^3$.

As a further improvement of the invention, the concentration of nitrogen oxides in the waste gas is 1680-2300 mg/$m^3$.

As a further improvement of the invention, the packings loaded in the BF include acid resistant porous granular materials.

As a further improvement of the invention, the diameter of the packings is 50-200 mm. As a further improvement of the invention, the method specifically comprises the following steps:

a) adding nutrient solution into the BF;
b) mixing the waste gas with air and passing it into the BF for treatment and controlling the operating temperature of the BF;
c) spraying the nutrient solution from the upper side of the BF, the nutrient solution flows out from the bottom, and then flows back to the upper side of the BF through a peristaltic pump for circulating spraying;
d) discharging the gas generated by the BF system through the gas outlet on the top of the BF.

As a further improvement of the invention, the operation temperature of the BF in step b) is controlled to be 25~35° C.

As a further improvement of the invention, reagents contained in the nutrient solution include $FeSO_4 \cdot 7H_2O$, $K_2HPO_4 \cdot 3H_2O$, KCl, $Ca(NO_3)_2 \cdot 4H_2O$, $CH_3COONa \cdot 3H_2O$ and $MgSO_4 \cdot 7H_2O$, and the pH value of the nutrient solution is 2.5.

As a further improvement of the invention, the air flow rate is controlled to be 0.1~0.3 $m^3$/h, the gas residue time is 100~130 s, and the liquid-gas ratio in the BF is 30~50 L/$m^3$.

3. Beneficial Effects

Compared with the prior art, the invention has the advantages of:

(1) The method for simultaneously removing high load sulfur dioxide and nitrogen oxides in the waste gas is to treat the high concentration nitrogen oxides and sulfur dioxide in the flue gas by directly acidic. The molar concentration ratio of $SO_2$ and $NO_x$ in the waste gas at the inlet is set as (0.76-1.06):1, and the treatment concentration of sulfur dioxide in the waste gas reaches 2700-3600 mg/$m^3$, and nitrogen oxide 1680~2300 mg/$m^3$, so as to solve the defects of relatively low treatment concentration of nitrogen oxide and low removal rate in bio-treatment previously. The method of the invention has high removal rates of sulfur dioxide and nitrogen oxide, in which the average removal rate of $SO_2$ reaches 100%, the average removal rate of $NO_x$ is 78%.

(2) The method for simultaneously removing sulfur dioxide and nitrogen oxides in the waste gas of the invention sets the molar concentration ratio of $SO_2$ and $NO_x$ in the waste gas at the inlet to be (0.76-1.06):1, in which the microbial system in the BF performs the biochemical reactions of nitrification, denitrification and sulfidation synergistically. In the reaction process, $NO_x$ is mainly converted into nitric acid and $SO_2$ is converted into sulfuric acid, which greatly improves the removal efficiency of $SO_2$ and $NO_x$ in the waste gas. However, the removal efficiency of $NO_x$ beyond this range is relatively low, which can not achieve the improvement of desulfurization and denitrification synchronous removal efficiency.

(3) The method for simultaneously removing sulfur dioxide and nitrogen oxides in waste gas can still play a better removal effect when the pH value of the system is less than 1.0 in the reaction process, which indicates that the method can make the microbial flora maintaining a high activity under extremely acidic condition. In contrast, prior art has to add biological activity enhancer to stimulate and improve the adaptability of the bacteria to the low pH, or to set up two BFs with pH adjustment to improve the waste gas removal effect. The method of the invention only needs to adjust the ratio of $SO_2$ and $NO_x$ at the inlet, which is easier to operate compared with the method of the prior art, does not need to increase the additional cost, and is conducive to popularization.

(4) The method for simultaneously removing the high load sulfur dioxide and nitrogen oxides in the waste gas only needs to inoculate the microbial flora in the BF and provide the nutrient solution required by the microbial flora. The microbial flora can come from the biological sludge of the bio-treatment system, so the treatment of nitrogen oxides and sulfur dioxide can be carried out continuously and stably without the continuous addition of other chemicals during the operation process. In the treatment process, nitrogen oxides and sulfur dioxide can be fully converted into nitric acid, sulfuric acid, or nitrogen, so as to improve the simultaneous removal efficiency of nitrogen oxides and sulfur dioxide. On the other hand, the method of the invention does not need to adjust the pH value during the operation of the system, and can also realize the recovery and utilization of acid liquid.

In FIGS., 1 air inlet; 2 flowmeter; 3 air inlet pipeline; 4 packing container; 5 spraying device; 6 air outlet; 7 nutrient solution inflow pipeline; 8 peristaltic pump; 9 nutrient solution storage container; 10 nutrient solution outflow pipeline.

DETAILED DESCRIPTION

The invention will be further described in combination with specific examples.

Example 1

The waste gas in this example comes from the simulated flue gas generated by the gas generation device. Before entering the synchronous desulfurization and denitrification BF for treatment, the simulated flue gas is first introduced into the mixing device to mix the simulated flue gas and air.

Figure 1:
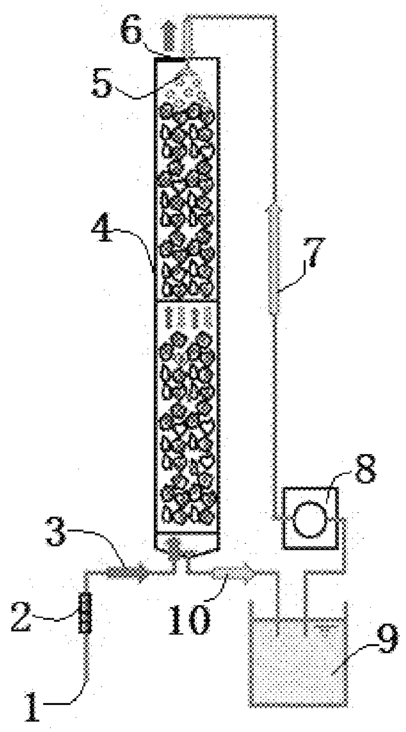
FIG. 1 is the structural diagram of the BFs used in example 1.

As shown in FIG. 1, the air inlet 1, gas flowmeter 2, air inlet pipeline 3, packing container 4, nutrient solution spraying device 5, air outlet 6, nutrient solution inflow pipeline 7, peristaltic pump 8, nutrient solution storage container 9 and nutrient solution outflow pipeline 10 of the BF for simultaneous removal of high load sulfur dioxide and nitrogen oxides are disclosed in this example.

The waste gas can enter the BF through the air inlet 1, and enter the packing container 4 of the BF through the air inlet pipeline 3. In this process, the gas flow is regulated by the gas flowmeter 2, and the generated gas is discharged through the top of the packing container 4. A nutrient solution spraying device 5 is placed at the upper end of the packing container 4, and used for evenly spraying the nutrient solution. During the operation, the nutrient solution is sprayed from the upper end, passes through the biofilm packing area of the packing container 4 and flows out from the bottom. The outflow nutrient solution flows into the nutrient solution storage container 9 through the nutrient solution inflow pipeline 7. The nutrient solution inflow pipeline 7 is placed between the nutrient solution storage container 9 and the nutrient solution spraying device 5, and a peristaltic pump 8 is installed on the nutrient solution inflow pipeline 7. Therefore, the nutrient solution in the nutrient solution storage container 9 can be pumped back to the nutrient solution spray device 5, and repeatedly sprayed and utilized during the operation of the BF. Baffles are respectively arranged at the lower end and the middle part of the packing container 4 for fixing the packings loaded with microorganisms.

The packings in this example are ceramsite particles with a diameter of 5 mm, on which 10 g of sludge from the biotreatment tank of the sewage system is inoculated, and the sludge provides microorganisms for the BF to simultaneously remove sulfur dioxide and nitrogen oxides.

In this example, the method for simultaneously removing high load sulfur dioxide and nitrogen oxides in waste gas specifically includes the following steps:

1) The nutrient solution is added into the BF, and the waste gas to be treated is introduced into the BF system. In this example, the molar concentration ratio of sulfur dioxide and nitrogen oxides in the waste gas is (0.76~.06):1, the concentration of sulfur dioxide at the air inlet 1 is 2700~3600 mg/$m^3$, and the concentration of nitrogen oxides is 1680~2300 mg/$m^3$.
2) In the example, the desulfurization and denitrification treatment is carried out in an aerobic environment, the aerobic environment is provided by air, the oxygen concentration in the air is 20%, the air flow rate is kept at 0.1$m^3$/h, the gas residence time is 100 seconds, and the liquid-gas ratio is 30 L/$m^3$.
3) During the operation of the BF, the reaction temperature of the BF is controlled to be 25° C., and the nutrient solution is sprayed at the rate of 8L/h. After collecting at the bottom, the nutrient solution is returned to the nutrient solution spraying device 5 through the peristaltic pump 8 for circulating spraying, and the nutrient solution is replenished 20% every week and refreshed every two weeks.

The preparation process of the nutrient solution is as follows: setting the solution volume to be 1.0 L, adding chemical reagents by weight and adjusting the pH to 2.5 with dilute sulfuric acid, the chemical reagents include $FeSO_4 \cdot 7H_2O$, $K_2HPO_4 \cdot 3H_2O$, KCl, Ca $(NO_3)_2 \cdot 4H_2O$, $CH_3COONa \cdot 3H_2O$ and $MgSO_4 \cdot 7H_2O$, wherein the mass concentration of $FeSO_4 \cdot 7H_2O$ in the nutrient solution is 0.23 g/L; The mass concentration of $K_2HPO_4 \cdot 3H_2O$ is 0.655 g/L; The mass concentration of KCl is 0.1 g/L; The mass concentration of Ca $(NO_3)_2 \cdot 4H_2O$ is 0.01 g/L, and the mass concentration of $CH_3COONa \cdot 3H_2O$ is 0.498 g/L; The mass concentration of $MgSO_4 \cdot 7H_2O$ is 0.5 g/L.

After two cycles of operation, the concentrations of sulfur dioxide and nitrogen oxides at the air outlet 6 were detected: the concentration of sulfur dioxide was less than 100 mg/m$^3$, with an average of 2 mg/m$^3$, the removal rate was 99%~100%, with an average of 99.9%; the concentration of nitrogen oxides ranged from 160 mg/m$^3$ to 615 mg/m$^3$, with an average of 415 mg/m$^3$, the removal rates ranged from 66% to 92%, with an average of 77.5%.

Example 2

This example is basically the same as example 1, with the difference that:

In this example, the concentration of sulfur dioxide at the air inlet 1 range from 2850 to 3050 mg/m$^3$, nitrogen oxides 2150 to 2230 mg/m$^3$, and the molar concentration ratio of sulfur dioxide to nitrogen oxides in the waste gas is 0.76:1.

The packings are ceramsite particles with a diameter of 200 mm, the desulfurization and denitrification treatment in step 2) is carried out in an aerobic environment, the aerobic environment is provided by air, the oxygen concentration in the air is 20%, the air flow rate is kept at 0.2 m$^3$/h, the gas residue time is 110 seconds, and the liquid gas ratio is 40 L/m$^3$.

The operating temperature of the BF is 35° C.

After two cycles of operation, the concentrations of sulfur dioxide and nitrogen oxides in the waste gas at the air outlet 6 were detected: the concentration of sulfur dioxide ranged from 0 to 30 mg/m$^3$, the removal rate ranged from 99% to 100%, with an average of 99.9%; the nitrogen oxide 160 to 390 mg/m$^3$, the removal rate ranged from 80% to 92%, with an average of 85.4%.

Example 3

This example is basically the same as example 1, with the difference that:

In this example, the concentration of sulfur dioxide at the air inlet 1 range from 2930 to 3000 mg/m$^3$, nitrogen oxides 1680 to 2000 mg/m$^3$, and the molar concentration ratio of sulfur dioxide to nitrogen oxides in the waste gas is 1.06:1.

The packings are made of porous acid resistant plastic with a diameter of 100 mm, the desulfurization and denitrification treatment in step 2) is carried out in an aerobic environment, the aerobic environment is provided by air, the oxygen concentration in the air is 20%, the air flow rate is kept at 0.2 m$^3$/h, the gas residence time is 110 seconds, and the liquid gas ratio is 40 L/m$^3$.

The operating temperature of the BF is 30° C.

After two cycles of operation, the concentrations of sulfur dioxide and nitrogen oxides in the waste gas at the air outlet 6 were detected: the concentration of sulfur dioxide ranged from 0 to 80 mg/m$^3$, the removal rate ranged from 98% to 100%, with an average of 99.5%; the nitrogen oxide ranged from 260 to 300 mg/m$^3$, the removal rate 78% to 85%, with an average of 81.0%.

Example 4

This example is basically the same as example 1, with the difference that:

In this example, the concentration of sulfur dioxide at the air inlet 1 is 2700~3600 mg/m$^3$, the concentration of nitrogen oxides is 1800~2300 mg/m$^3$, and the molar concentration ratio of sulfur dioxide and nitrogen oxides in the waste gas is 0.9:1.

After two cycles of operation, the concentrations of sulfur dioxide and nitrogen oxides in the waste gas at the air outlet 6 were detected: the concentration of sulfur dioxide ranged from 0 to 30 mg/m$^3$, the removal rate ranged from 99% to 100%, with an average of 99.9%; the nitrogen oxide ranged from 190 to 600 mg/m$^3$, the removal rate 66% to 89%, with an average of 75.4%.

Comparative example 1

This example is basically the same as example 1, with the difference that:

In this example, the molar concentration ratio of sulfur dioxide and nitrogen oxides in the waste gas is (0.66~0.76): 1, the concentration of sulfur dioxide at the air inlet 1 is between 2500~3450 mg/m$^3$, and the concentration of nitrogen oxides is between 2250~2650 mg/m$^3$.

After two cycles of operation, the concentrations of sulfur dioxide and nitrogen oxides in the waste gas at the air outlet 6 were detected: the concentration of sulfur dioxide ranged from 0 to 20 mg/m$^3$, with an average of 1.3 mg/m$^3$, the removal rate ranged from 99% to 100%, with an average of 99.9%; the nitrogen oxide ranged from 600 to 910 mg/m$^3$, with an average of 791 mg/m$^3$, the removal rate 62% to 74%, with an average of 68.1%.

Comparative example 2

This example is basically the same as example 1, with the difference that:

In this example, the molar concentration ratio of sulfur dioxide and nitrogen oxides in the waste gas is (1.06~1.56): 1, the concentration of sulfur dioxide at the air inlet 1 is between 2450 to 3450 mg/m$^3$, and the nitrogen oxides between 1000 to 1750 mg/m$^3$.

After two cycles of operation, the concentrations of sulfur dioxide and nitrogen oxides in the waste gas at the air outlet 6 were detected: the concentration of sulfur dioxide ranged from 0 to 223 mg/m$^3$, with an average of 103 mg/m$^3$, the removal rate ranged from 93% to 100%, with an average of 97.0%; the nitrogen oxides ranged from 200 mg/m$^3$ to 787 mg/m$^3$, with an average of 448 mg/m$^3$, and the removal rate ranged from 36% to 82%, with an average of 65.2%.

Table 1 shows the results of simultaneous removal of sulfur dioxide and nitrogen oxides in the examples and comparative examples.

TABLE 1

Results of simultaneous removal of sulfur dioxide and nitrogen oxides in example 1 and comparative examples

| Name | the molar concentration ratio of $SO_2$ and $NOx$ | the concentration of $SO_2$ at the inlet ($mg/m^3$) | the average removal rate of $SO_2$ | the concentration of $NOx$ at the inlet ($mg/m^3$) | the average removal rate of $NOx$ |
|---|---|---|---|---|---|
| Example 1 | (0.76~1.06):1 | 2700~3600 | 99.9% | 1680~2300 | 77.5% |
| Example 2 | 0.76:1 | 2850~3050 | 99.9% | 2150~2230 | 85.4% |
| Example 3 | 1.06:1 | 2930~3000 | 99.5% | 1680~2000 | 81.0% |
| Example 4 | 0.9:1 | 2700~3600 | 99.9% | 1800~2300 | 75.4% |
| Comparative Example 1 | (0.66~0.76):1 | 2500~3450 | 99.9% | 2250~2650 | 68.1% |
| Comparative Example 2 | (1.06~1.56):1 | 3000~3600 | 97.0% | 1000~1750 | 65.2% |

According to table 1, when the molar concentration ratio of $SO_2$ and $NO_x$ is set to (0.76 1.06):1, the average $SO_2$ removal rate of the system reaches ~100%, and the average $NO_x$ removal rate reaches >76%, which significantly improves the synchronous removal efficiency. When the ratio is greater than or less than the range, the $NO_x$ removal rate of the system decreases.

Example 5

The invention verifies the mechanism of simultaneous removal of sulfur dioxide and nitrogen oxides from flue gas. In this example, a series of BFs (3 BFs)were settled up, and parallelly operated, in which R1 is the simultaneous removal BF, R2 is the denitrification BF, and R3 is the desulfurization BF.

The simulated flue gas containing nitrogen oxides and sulfur dioxide is introduced into the BFs respectively for treatment under aerobic environment. The microbial flora has the functions of nitrification, denitrification, sulfidation and desulfurization, in which nitrification and denitrification are the main mechanisms for removing nitrogen oxides, and sulfidation is the main mechanism for removing sulfur dioxide.

The invention studies the reaction mechanism of nitric acid and sulfuric acid produced by oxidation of nitrogen oxide and sulfur dioxide with or without microbial mediation under aerobic conditions, as well as the main microbial community types that mediate the reaction.

By monitoring the concentration of sulfur dioxide, nitrogen dioxide and nitric oxide in the inlet and outlet gas of the reactor, the concentration of nitrate and sulfate in the circulating nutrient solution of the reactor and the pH value, the reaction mechanism of nitric acid and sulfuric acid produced by the oxidation of nitrogen oxides and sulfur dioxide mediated by microorganisms was studied. Then, high-throughput sequencing technology was used to study the microbial molecular mechanisms of simultaneous and separate removal of $NO_x$ and $SO_2$ from simulated flue gas.

1) Study on BF R1

In R1, the average outlet gas concentration of $SO_2$ is kept at less than 100 $mg/m^3$, the concentration of $NO_x$ is between160 to 620 $mg/m^3$, including 108-463 $mg/m^3$ NO and 22-187 $mg/m^3$ $NO_2$. Among them, the concentration of $SO_2$ is far lower than the limit value of $SO_2$ emission concentration (400 $mg/m^3$) in China's boiler air pollutant emission standard (GB 13271-2014), which meets the emission requirements.

After the third cycle of stable operation of the reactor, the removal of $SO_2$ and $NO_x$ in R1 showed a significant correlation ($r^2$=0.33, $p<0.05$) during the third to seventh cycle, and the molar ratio of synergistic removal was 1.06:1 (Formula 1). However, the concentrations of $SO_4^{2-}$ and $NO_3^-$ in the nutrient solution of R1 showed different increasing trends:

a) at the initial stage (day 2-4 of the 3rd cycle), $SO_4^{2-}$ and $NO_3^-$ in R1 increased linearly;
b) from day 4 to day 7, the growth of $SO_4^{2-}$ and $NO_3^-$ slowed down or even stopped;
c) the concentration of $SO_4^{2-}$ and $NO_3^-$ increased in S-form after about 20% nutrient solution supplement on the 7th day, and accumulated to 23.07 g/L and 15.93 g/L respectively before complete nutrient solution replacement (day 12-14 of the 3rd cycle). The concentrations of $SO_4^{2-}$ and $NO_3^-$ in the nutrient solution were highly significantly correlated ($r^2$=0.87, $p<0.001$), showing a synergistic effect. The molar concentration ratio of $SO_4^{2-}$ and $NO_3^-$ in the solution was 1.30:1, accounting for 81.0% and 81.7% of the total amount of N and S eliminated from the gas, respectively.

A portion (about 15%) of $SO_4^{2-}$ and $NO_3^-$ may be retained in the packings' pores by adsorption, which also leads to the emergence of plateau period and the rapid recovery of $SO_4^{2-}$ and $NO_3^-$ concentration after the nutrient solution supplement. However, compared with our study of simultaneous removal of $SO_2$ and $NO_x$ at low load (1500~2700 $mg/m^3$ and 950~1700 $mg/m^3$ respectively), the concentration of $NO_3^-$ in the solution was significantly higher (77.8% in low load solution, $p<0.05$), and the relative abundance of denitrifying microorganisms *Pseudomonas* and *Rhodococcus* decreased significantly (*Pseudomonas* decreased from 52.7% to 1.0%, *Rhodococcus* decreased from 19.2% to 0.6%), while the relative abundances of nitrifying microorganisms, such as *Arthrobacter, Nitrospira, Flavobacterium* and *Hypomicrobium* increased to 1%~2% of the total microbial abundances, indicating that the nitrogen oxide removal reaction reduced the denitrification, but increased the nitrogen oxide oxidation.

In the reaction system of the invention, there is a denitrifying nitrogen removal reaction due to the existence of denitrifying microorganisms.

$$10e^-+2NO_3^-+12H^+\rightarrow N_2+6H_2O \quad \text{Formula 1}$$

The concentration of $SO_4^{2-}$ was significantly lower ($p<0.05$) than that of low load solution (84.8%). The appearance of desulfurizing microorganism *Paenibacillus* indicated that part of $SO_4^{2-}$ entering the solution was utilized by microorganisms, reduced to sulfur and stored in cells, which was also consistent with the sulfur color on the surface of packings. Therefore, in the reaction system of the invention, there is a sulfate reduction reaction:

Formula 2

$$2SO_4^{2-} + 10H^+ \xleftrightarrow{\text{Microbes}} R{-}S{-}S{-}R + 4H_2O + 2H^+ \longrightarrow 2R{-}H + 2S + 4H_2O$$

Therefore, under the microbial catalytic system of the invention, the simultaneous removal reaction of nitrogen oxide and sulfur dioxide is carried out according to the reaction formula 3

Formula 3

$$127SO_2 + 100NO_x + 150O_2 \xrightarrow{H_2O} 126SO_4^{2-} + 98NO_3^- + S + N_2 \xleftrightarrow{\text{Packings}} 12.6SO_4^{2-}(ab) + 9.8NO_3^-(ab) + 113.4SO_4^{2-} + 88.2NO_3^- + S + N_2$$

Figure 2:
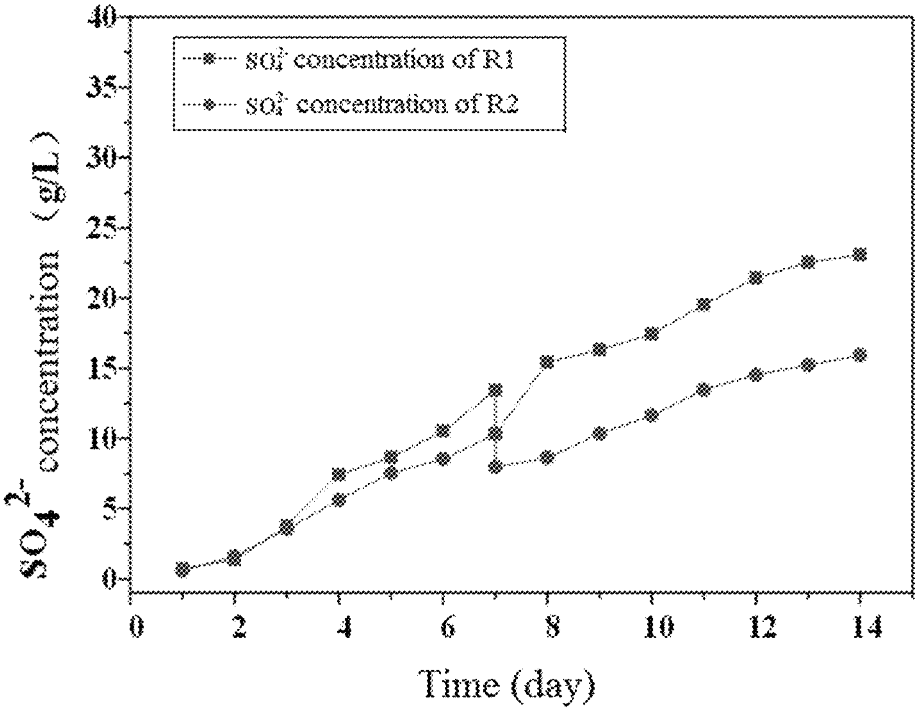
FIG. 2 shows the change in $SO_4^{2-}$ concentration in BFs (R1 and R2) in example 5.
Figure 3:
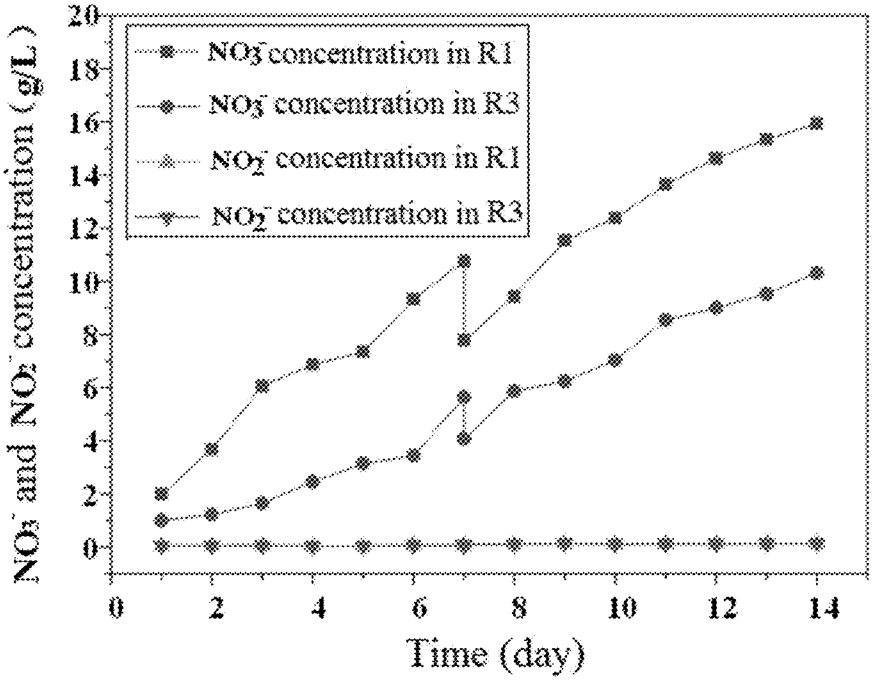
FIG. 3 shows the change in $NO_3^-$ and $NO_2^-$ concentration in BFs (R1 and R3) in example 5.
Figure 4:
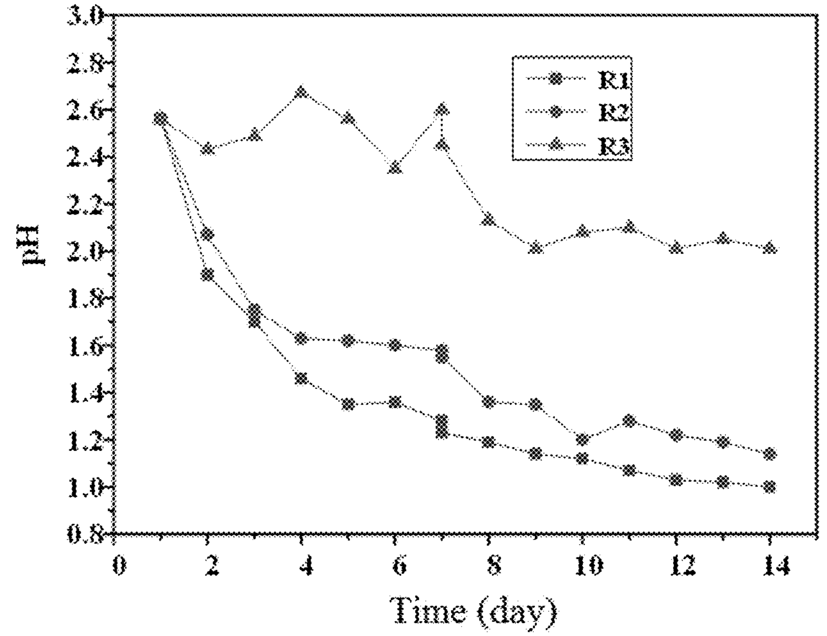
FIG. 4 shows the change in pH value in BFs (R1, R2 and R3) in example 5.

FIG. 2 is a comparison of the $SO_4^{2-}$ concentration in the circulating nutrient solution of R1 and R2 in this example; FIG. 3 is a comparison of the $NO_3^-$ and $NO_2^-$ concentrations in the circulating nutrient solution of R1 and R3; FIG. 4 is a comparison of the pH values in R1, R2 and R3 in this example.

2) Study on Independently Desulfurization R2 or Denitrification R3

In the other two bioreactors, the $SO_2$ emission concentration of R2 is 0-1151 mg/m$^3$; the $NO_x$ emission concentration of R3 is 536~810 mg/m$^3$, including 275~643 mg/m$^3$ NO and 135~422 mg/m$^3$ $NO_2$.

Figure 5:
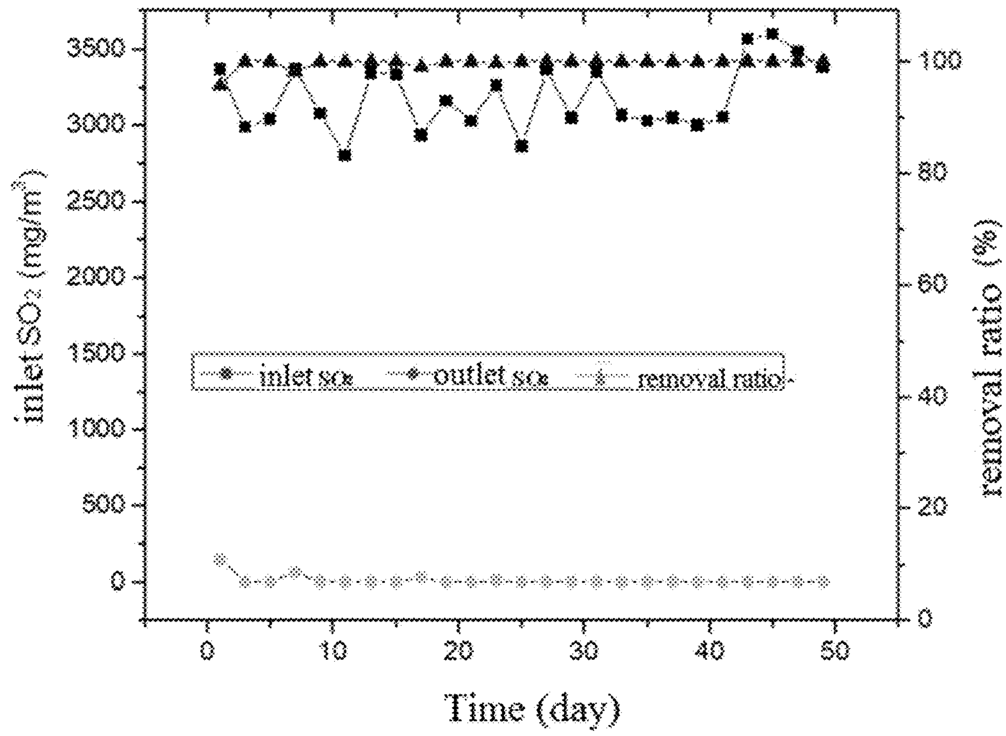
FIG. 5 shows the $SO_2$ removal level of BF (R1) in example 5.
Figure 6:
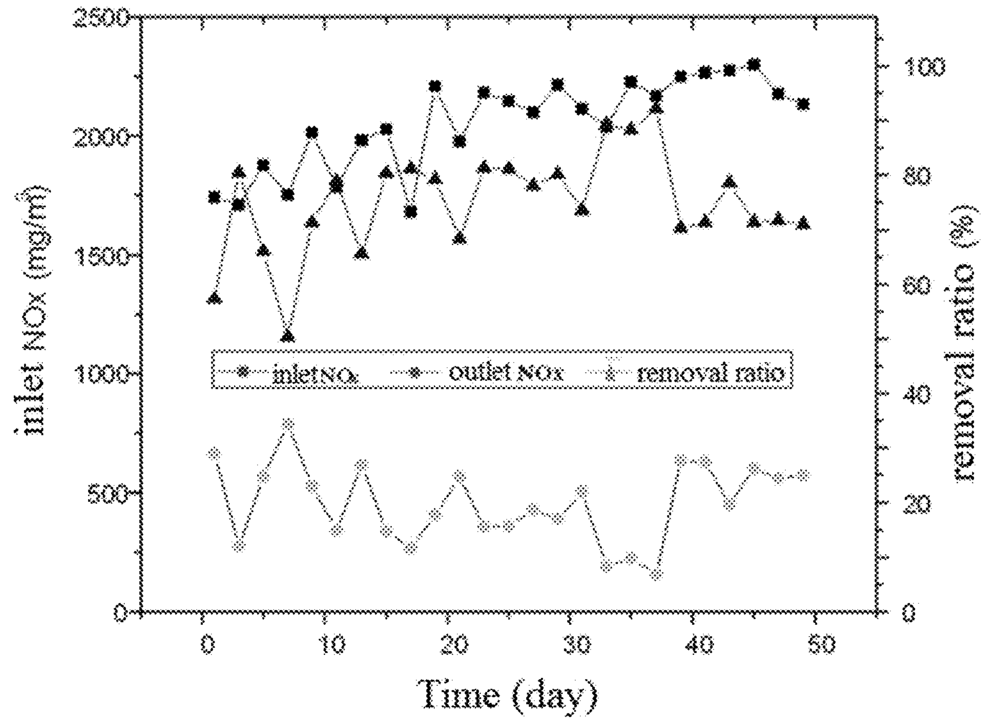
FIG. 6 shows the $NO_x$ removal level of BF (R1) in example 5.
Figure 7:
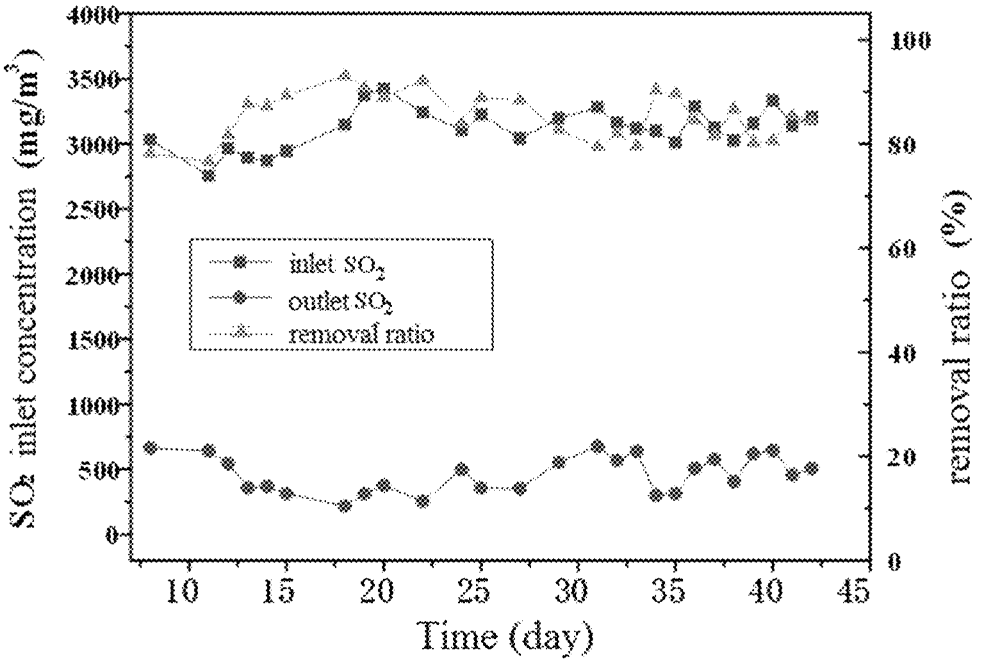
FIG. 7 shows the $SO_2$ removal level of BF (R2) in example 5.
Figure 8:
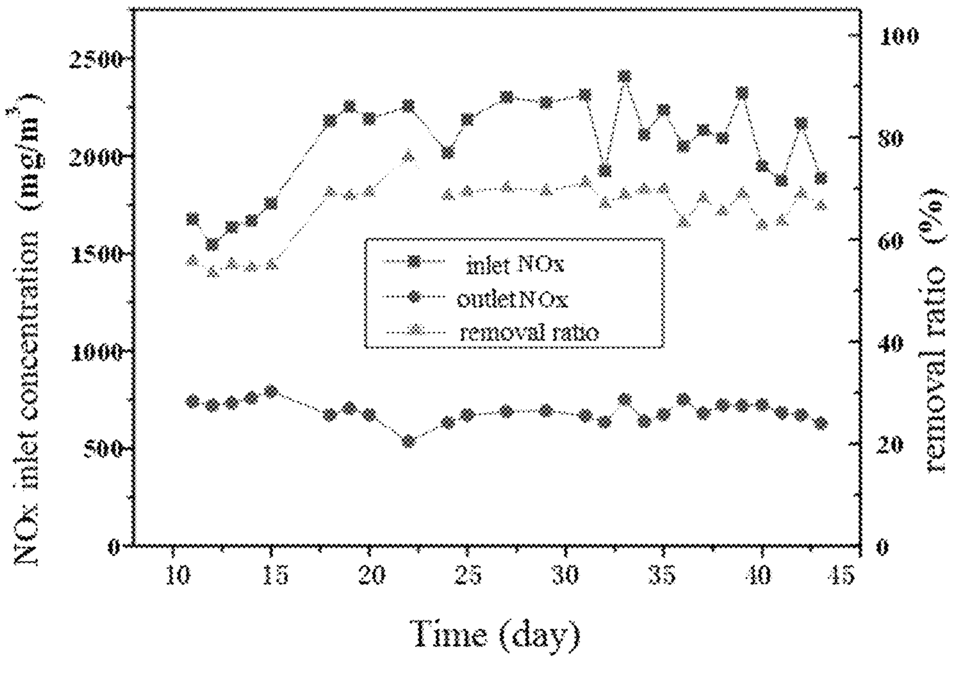
FIG. 8 shows the $NO_x$ and $SO_2$ removal level of BF (R3) in example 5.

There was no significant difference in the inlet concentration between R1 with R2, or R1 with R3. The performance of R1, i.e. the removal rates of $SO_2$ and $NO_x$ (99.9% and 77.5%) were significantly better than those of R2 (81.9%, $SO_2$) or R3 (67.7%, $NO_x$ ) ($p<0.05$), FIG. 5 shows the $SO_2$ removal rate of R1 in example 5; FIG. 6 shows the removal rate of $NO_x$ of R1 in example 5; FIG. 7 shows the $SO_2$ removal rate of R2 in example 5; FIG. 8 shows the $NO_x$ removal rate of R3 in example 5.

Figure 9:
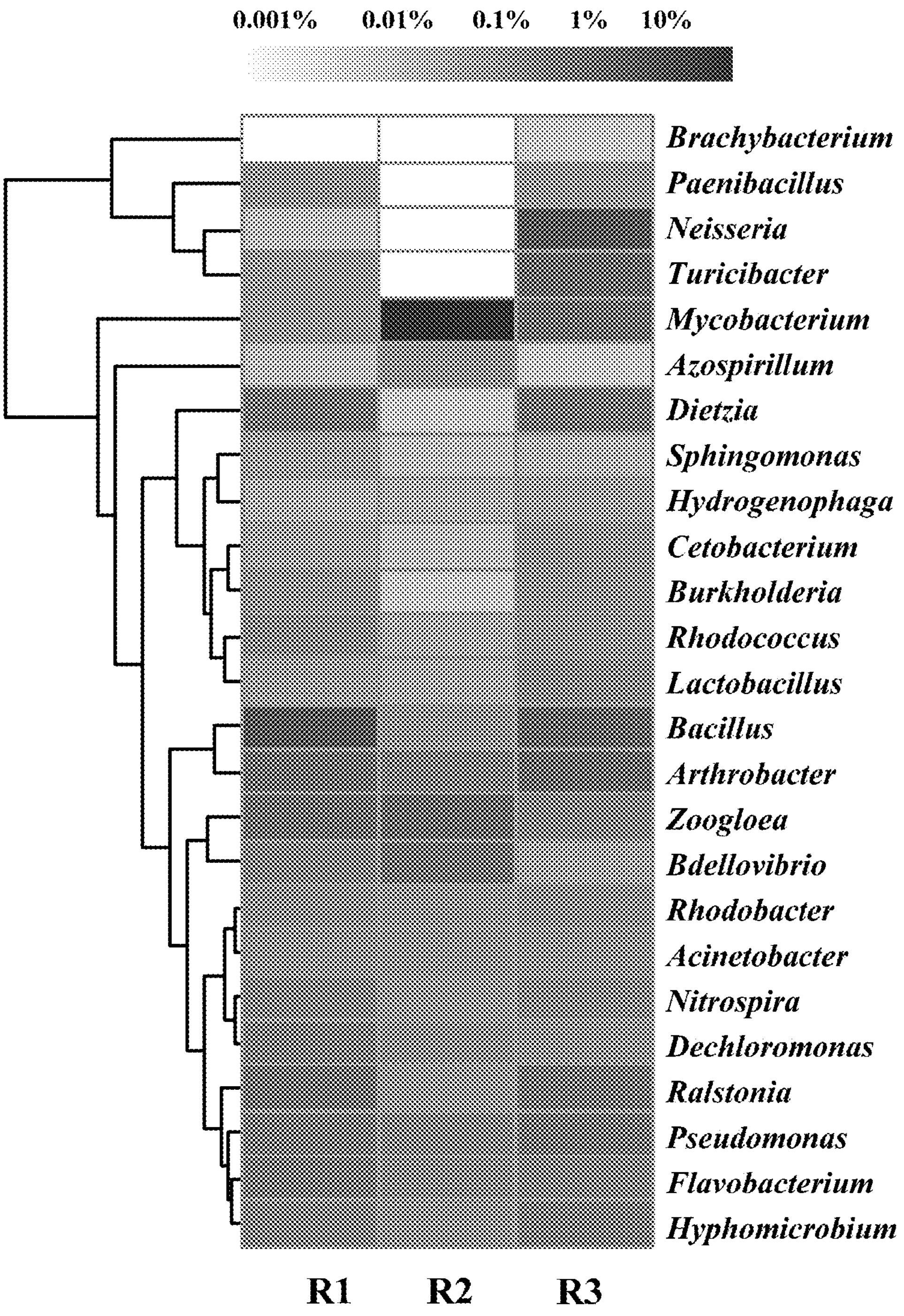
FIG. 9 shows the microbial community level in BFs (R1, R2 and R3) in example 5.

In the invention, the microorganism includes nitrifying microorganism, denitrifying microorganism and sulfurizing microorganism. Specific microbial species are nitrification or nitrite oxidation function, denitrification function, sulfurization function and desulfurization function. FIG. 9 shows the difference of microbial community level in R1, R2 and R3.

In FIG. 9, the microbial species with nitrification or nitrite oxidation function include *Arthrobacter, Nitrospira, Flavobacterium, Pseudomonas, Rhodococcus, Ralstonia* and *Hypomicrobium*, and the denitrification microbes include *Pseudomonas, Rhodococcus, Bacillus, Acinetobacter, Candida Acinetobacter, Zoogloea* and *Hypomicrobium*; the microbial species with sulfurization function include *Dietzia, Burkholderia, Mycobacterium, Pseudomonas, Rhodococcus*, and the desulfurization microbes include *Paenibacillus.*

Table 2 shows the comparison of removal efficiency of different BFs.

TABLE 2

Comparison of removal efficiency of different BFs

| BF | Inlet $SO_2$ (mg/m$^3$) | Outlet $SO_2$ (mg/m$^3$) | $SO_2$ Removal Rate | Inlet NO*x* (mg/m$^3$) | Outlet NO*x* (mg/m$^3$) | NO*x* Removal Rate |
|---|---|---|---|---|---|---|
| R1 | 2700~3300 | 0~100 | 99.9% | 1700~2300 | 160~615 | 77.5% |
| R2 | 2500~3100 | 0~1151 | 81.9% | — | — | — |
| R3 | — | — | — | 1900~2650 | 488~810 | 67.7% |

The present invention and its examples have been described above, and the description is not restrictive. Therefore, it shall be within the protection scope of the invention if ordinary technical personnel in the art are inspired by the invention to design a structure and an example similar to the technical solution without creatively departing from the creative purpose of the invention.

What is claimed is:

1. A method for simultaneously removing high load sulfur dioxide and nitrogen oxides in waste gas, characterized by: the method comprising introducing waste gas into a packed biotrickling-filter (BF) to synchronously desulfurize and denitrify the waste gas, packings in the BF are loaded with microbial flora for synchronous removal, and a molar concentration ratio of sulfur dioxide and nitrogen oxides in the waste gas is (0.76~1.06):1, wherein a concentration of sulfur dioxide in the waste gas is 2850-3050 mg/m$^3$, and a concentration of nitrogen oxides in the waste gas is 2150-2230 mg/m$^3$, and wherein the microbial flora includes: *Arthrobacter, Nitrospira, Flavobacterium, Pseudomonas, Rhodococcus, Ralstonia, Hyphomicrobium, Pseudomonas, Rhodococcus, Bacillus, Acinetobacter, Candidatus Acinetobacter, Zoogloea, Hyphomicrobium, Dietzia, Burkholderia, Mycobacterium, Pseudomonas, Rhodococcus* and *Paenibacillus*, and the source of the microbial flora is biological sludge.

2. The method for simultaneously removing high load sulfur dioxide and nitrogen oxides in waste gas according to claim 1, wherein the packings loaded in the BF includes acid resistant porous granular materials.

3. The method for simultaneously removing high load sulfur dioxide and nitrogen oxides in waste gas according to claim 2, wherein a diameter of the packings is 50-200 mm.

4. The method for simultaneously removing high load sulfur dioxide and nitrogen oxides in waste gas according to claim 1, wherein the method specifically comprising the following steps:

a) adding nutrient solution into the BF;

b) mixing the waste gas with air and passing it into the BF for treatment, controlling operating temperature of the BF;

c) spraying the nutrient solution from the upper side of the BF, the nutrient solution flows out from the bottom, and then flows back to the upper side of the BF through a peristaltic pump for circulating spraying;

d) discharging gas treated by the BF system through a gas outlet on the top of the BF.

5. The method for simultaneously removing high load sulfur dioxide and nitrogen oxides in waste gas according to claim 4, wherein the operating temperature of the BF in step b) is 25~35° C.

6. The method for simultaneously removing high load sulfur dioxide and nitrogen oxides in waste gas according to claim 5, wherein reagents contained in the nutrient solution include $FeSO_4 \cdot 7H_2O$, $K_2HPO_4 \cdot 3H_2O$, KCl, $Ca(NO_3)_2 \cdot 4H_2O$, $CH_3COONa \cdot 3H_2O$ and $MgSO_4 \cdot 7H_2O$, and a pH value of the nutrient solution is 2.5.

* * * * *